(12) United States Patent
Kristjansson et al.

(10) Patent No.: US 10,614,173 B2
(45) Date of Patent: Apr. 7, 2020

(54) AUTO-TRANSLATION FOR MULTI USER AUDIO AND VIDEO

(71) Applicant: Google LLC, Mountain View, CA (US)

(72) Inventors: Trausti Kristjansson, Mountain View, CA (US); John Huang, San Carlos, CA (US); Yu-Kuan Lin, Mountain View, CA (US); Hung-ying Tyan, Taipei (TW); Jakob David Uszkoreit, San Francisco, CA (US); Joshua James Estelle, San Francisco, CA (US); Chung-yi Wang, Taipei (TW); Kirill Buryak, Sunnyvale, CA (US); Yusuke Konishi, Tokyo (JP)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/506,108

(22) Filed: Jul. 9, 2019

(65) Prior Publication Data

US 2019/0332679 A1    Oct. 31, 2019

Related U.S. Application Data

(63) Continuation of application No. 15/664,706, filed on Jul. 31, 2017, now Pat. No. 10,372,831, which is a
(Continued)

(51) Int. Cl.
*G06F 17/28* (2006.01)
*G10L 15/26* (2006.01)
(Continued)

(52) U.S. Cl.
CPC ............ *G06F 17/289* (2013.01); *G10L 13/00* (2013.01); *G10L 15/26* (2013.01); *H04M 3/56* (2013.01);
(Continued)

(58) Field of Classification Search
CPC ....................................... G06F 17/28
(Continued)

(56) References Cited

U.S. PATENT DOCUMENTS 5,815,196 A    9/1998  Alshawi
6,292,769 B1 *  9/2001  Flanagan ............ G06F 17/2827
                                                    704/277

(Continued)

*Primary Examiner* — Michael C Colucci
(74) *Attorney, Agent, or Firm* — Honigman LLP

(57) ABSTRACT

The disclosed subject matter provides a system, computer readable storage medium, and a method providing an audio and textual transcript of a communication. A conferencing services may receive audio or audio visual signals from a plurality of different devices that receive voice communications from participants in a communication, such as a chat or teleconference. The audio signals representing voice (speech) communications input into respective different devices by the participants. A translation services server may receive over a separate communication channel the audio signals for translation into a second language. As managed by the translation services server, the audio signals may be converted into textual data. The textual data may be translated into text of different languages based the language preferences of the end user devices in the teleconference. The translated text may be further translated into audio signals.

20 Claims, 5 Drawing Sheets

Related U.S. Application Data continuation of application No. 14/827,826, filed on Aug. 17, 2015, now Pat. No. 9,720,909, which is a continuation of application No. 13/316,689, filed on Dec. 12, 2011, now Pat. No. 9,110,891.

(51) Int. Cl.
 *G10L 13/00* (2006.01)
 *H04M 3/56* (2006.01)
 *H04N 7/15* (2006.01)

(52) U.S. Cl.
 CPC .............. *H04M 3/568* (2013.01); *H04N 7/15* (2013.01); *H04N 7/152* (2013.01); *H04M 2203/2061* (2013.01); *H04M 2242/12* (2013.01)

(58) Field of Classification Search
 USPC .... 704/2, 201, 235, 277; 715/719, 733, 739; 455/406, 414.14; 379/202.01, 88.14
 See application file for complete search history.

(56) References Cited

U.S. PATENT DOCUMENTS

| | | | | |
|---|---|---|---|---|
| 6,339,754 B1* | 1/2002 | Flanagan | ............ | G06F 17/2827 704/2 |
| 6,859,820 B1* | 2/2005 | Hauduc | ................ | G06F 9/454 709/203 |
| 7,054,804 B2 | 5/2006 | Gonzales et al. | | |
| 7,194,687 B2* | 3/2007 | Sezan | ................ | H04L 12/2805 715/716 |
| 7,440,746 B1* | 10/2008 | Swan | ................ | H04M 3/42365 455/412.1 |
| 7,734,467 B2 | 6/2010 | Gao et al. | | |
| 7,830,408 B2 | 11/2010 | Asthana et al. | | |
| 7,970,598 B1* | 6/2011 | Flanagan | ............. | G06F 17/289 704/2 |
| 8,051,452 B2* | 11/2011 | Arseneau | ............. | G06F 1/1626 725/37 |
| 8,259,910 B2* | 9/2012 | Afifi | ................... | H04M 3/5232 379/88.14 |
| 8,327,270 B2 | 12/2012 | Jones et al. | | |
| 8,498,871 B2 | 7/2013 | Miglietta et al. | | |
| 8,699,994 B2* | 4/2014 | Kim | ................... | G06Q 30/0601 455/406 |
| 2003/0009329 A1* | 1/2003 | Stahl | ..................... | H04R 3/005 704/233 |
| 2003/0018726 A1* | 1/2003 | Low | ........................ | H04L 51/04 709/206 |
| 2004/0034521 A1* | 2/2004 | Kawakura | ............ | G06F 17/275 704/1 |
| 2004/0102957 A1* | 5/2004 | Levin | ................. | G06F 17/2845 704/3 |
| 2004/0267527 A1* | 12/2004 | Creamer | ............ | G10L 19/0018 704/235 |
| 2008/0022211 A1* | 1/2008 | Jones | ..................... | G09B 7/00 715/739 |
| 2008/0195482 A1* | 8/2008 | Sailer | .................... | G06F 17/289 705/14.14 |
| 2009/0099836 A1 | 4/2009 | Jacobsen et al. | | |
| 2009/0234643 A1* | 9/2009 | Afifi | ........................ | G10L 15/26 704/201 |
| 2010/0185445 A1* | 7/2010 | Comerford | ............ | G10L 15/06 704/251 |
| 2010/0250231 A1* | 9/2010 | Almagro | ............... | G06F 17/289 704/2 |
| 2010/0257234 A1* | 10/2010 | Caughey | ............... | H04L 67/306 709/203 |
| 2011/0134910 A1* | 6/2011 | Chao-Suren | ......... | G06F 17/289 370/352 |
| 2011/0224981 A1* | 9/2011 | Miglietta | ................. | G10L 15/26 704/235 |
| 2011/0282645 A1* | 11/2011 | Khuda | .................. | G06F 17/289 704/3 |
| 2011/0287748 A1* | 11/2011 | Angel | ............... | H04M 3/42221 455/414.1 |
| 2012/0109631 A1* | 5/2012 | Gopal | .................. | G06F 16/958 704/3 |
| 2012/0330644 A1* | 12/2012 | Giraudy | ................ | G06F 17/289 704/3 |
| 2013/0058471 A1* | 3/2013 | Garcia | ............. | H04M 3/42221 379/202.01 |

\* cited by examiner

AUTO-TRANSLATION FOR MULTI USER AUDIO AND VIDEO

CROSS-REFERENCE TO RELATED APPLICATIONS

This application is a continuation of, and claims priority under 35 U.S.C. § 120 from, U.S. patent application Ser. No. 15/664,706, filed on Jul. 31, 2017, which is a continuation of U.S. patent application Ser. No. 14/827,826, filed on Aug. 17, 2015, which is a continuation of U.S. patent application Ser. No. 13/316,689, filed on Dec. 12, 2011. The disclosures of these prior applications are considered part of the disclosure of this application and are hereby incorporated by reference in their entireties.

BACKGROUND

Participants in a teleconference have found it helpful to have a transcript of the teleconference conversation. In the event the audio connection of the teleconference is poor, closed-captioning provides users with the ability to read what is being spoken. In the teleconference context, these closed-captioning services are typically performed by a third party stenography service. The third party stenographer sits in on the teleconference to provide the close captioning and a text transcript of the conversation. However, this may prohibit impromptu calls between teleconference participants, who want a text transcript of the conversation. Additionally, if the participants speak and read different languages from one another, a translation of the transcript and closed-captioning may be required. If the participants are to have a meaningful conversation, it may be necessary to generate the closed-captioning in real time. Adding a third-party translator to a teleconference can increase the complexity and cost of a teleconference to such a point that it would be prohibitive for a casual user to conduct such a teleconference.

BRIEF SUMMARY

According to an embodiment of the disclosed subject matter, the implementation may include a conferencing services server, a translation services server, a data storage, a speech-to-text processor, a translation processor, and a text-to-speech processor. The conferencing services may exchange text and audio data signals between communicatively coupled devices. The audio data signals may represent communication in a first spoken language, while the text signals may represent communication in the same or another spoken language. The data storage may store data including text and audio data signals. The translation services server may receive audio signals from devices via a separate communication channel. The speech-to-text processor may be configured to convert the first spoken language audio data signals into text corresponding to the communication in the first spoken language. The translation processor may be configured to translate the first language text into text in a second language. The text-to-speech processor may be configured to convert the second language text into audio signals representing a spoken version of the second language text. The second language text and audio signals may be stored in the data storage. The translation server may deliver the second language text and audio signals to the respective device requesting translation services.

According to an embodiment of the disclosed subject matter, the implementation may include a method for providing an audio and textual transcript of a communication. The method may include receiving audio signals representing speech in a first spoken language at a conferencing services device. The received audio signal may be delivered to an end user device. The delivered audio signals may be received at a translation services server over a separate communication channel with the end user device at which the audio signals may be converted into text of the first spoken language by a processor in the speech-to-text server. The converted text of the first spoken language may be stored. The first spoken language text may be translated into text of a second language. The translated text of a second language may also be stored. The second language text may be converted into audio signals representing speech in the second spoken language, and at least one of the received audio data, the stored text, or the translated audio signals may be delivered back to the end user device over the separate communication channel.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

There is a need to automate the conversion of a teleconference transcript into text, and providing the text to the users either in the form of closed-captioning or a post-transcript, searchable computer-readable file. In addition, the translation of the text into different languages also needs to be automated so persons with different language capabilities can easily schedule and participate in real-time teleconferences. It would also be beneficial if the text conversion and translation capabilities were applicable to mobile device-based chats and messaging.

Figure 1:
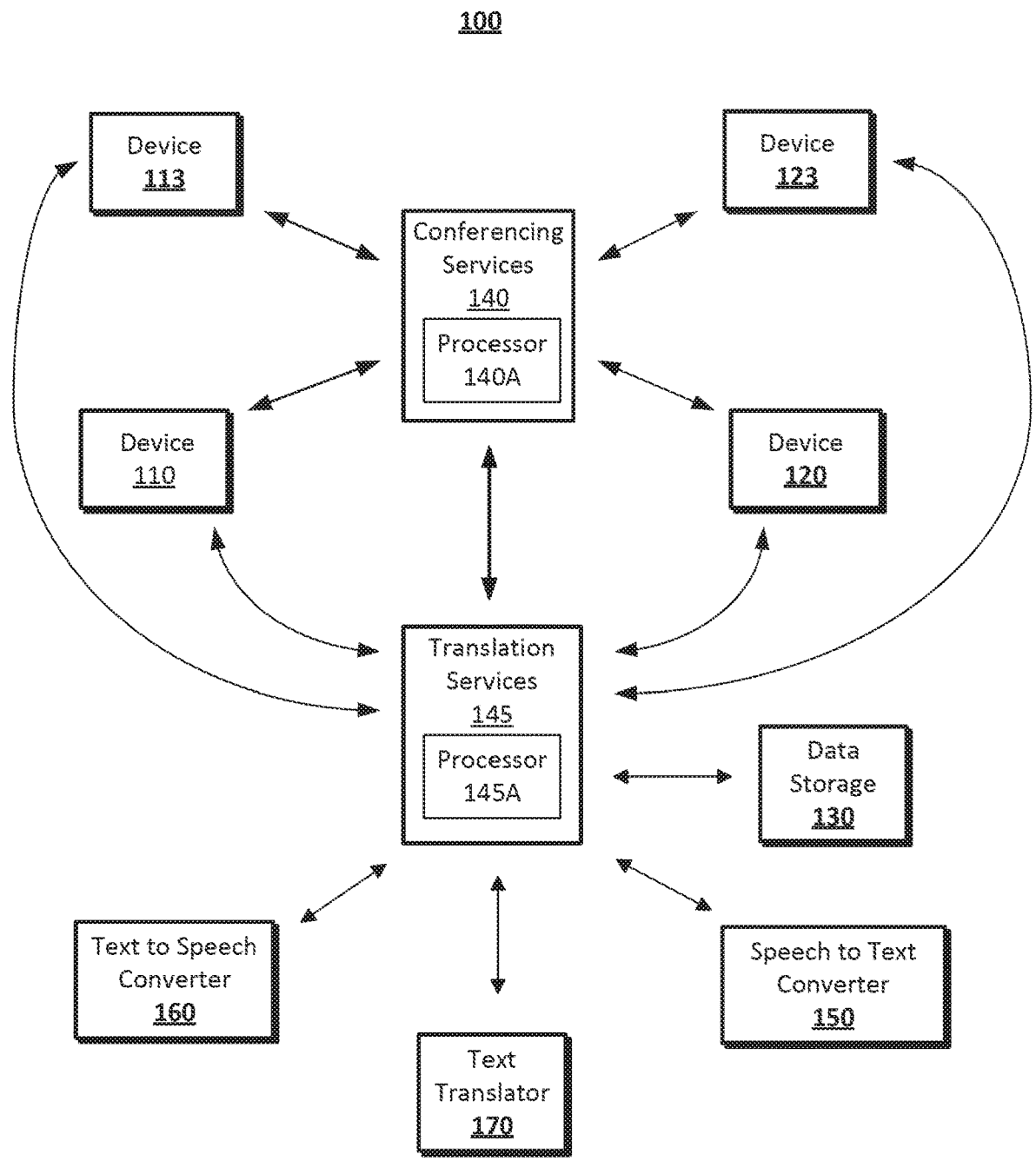
FIG. 1 shows a system configuration according to an embodiment of the disclosed subject matter.

A system 100 as illustrated in FIG. 1 may include a conferencing services server 145, a translation services server 140, a number of devices 110, 113, 120, 123, a speech-to-text converter 150, a text-to-speech converter 160, a text translator 170 and data storage 130. The conferencing services server 140 may include a processor 140A for executing different processes. The devices 110, 113, 120 and 123 may be any device that has an input device, such as a microphone, keyboard, or a touchscreen, that converts speech into audio signals. For example, device 110 may be a desktop computer having a microphone and keyboard, while device 120 may be a portable device such as a smartphone with a microphone, a touchpad and/or a keyboard. The end user devices 110, 113, 120 or 123 may also be an Internet-capable desktop phone, laptop computer, a tablet computer, a smartphone or the like. The end user devices 113 and 123 may also be one of the above described devices. The end user devices 110, 113, 120 and 123 may have a preferences menu to identify language preferences of users of the device. For example, a user may be able to set a language preference as English with secondary language preferences as Spanish and Japanese. In addition, the order or priority of the language preferences may be changed by the user while the device is being used to communicate with other devices. The end user devices 110, 113, 120 and 123 may also be connectable to, or may incorporate a camera. Each of the end user devices 110, 113, 120, 123 may communicate with the conferencing services server 140 and/or the translation server 145 via network connections (represented by the arrows in FIG. 1) and stream encoded audio signals to the network. The network connections may be a telephone network, computer network (e.g., LAN, WAN, etc.), or the Internet or a combination thereof. The end user devices 110 and 120 may deliver encoded audio signals, video signals or both to the conferencing services server 140 and/or the translation services server 145. The conferencing services server 140 may perform conferencing services such as coordinating, organizing conferences, establishing communications between devices, and other conference management functions.

The translation services server 145 may also include a processor 145A for coordinating translation functions of the audio or text signals. The translation services server 145 may be communicatively coupled to the end user devices 110, 113, 120 and 123 via a communication network, such as the Internet or a mobile communication network. The end user devices 110, 113, 120 and 123 may include a processor that executes a communication application. The communication application may include functionality to intercept incoming text or audio signals during a teleconference communication, recognize the language of incoming audio signals, and cause the respective device to establish a connection with the translation services server 145 based on the recognition result. For example, if the recognized language does not correspond to a language preference setting of the end user device, the end user device may establish a separate connection with the translation services server 145 and forward the incoming text or audio signals to the translation services server 145 for translation to one of the end user device's set language preferences. Although the system 100 is illustrated with four devices 110, 113,120 and 123 connected to conferencing services server 140, it should be understood that more or fewer end user devices may participate in the communication between devices 110, 113, 120 and 123 through the conferencing services server 140. The conferencing services server 140 may manage a plurality of different teleconference sessions between a plurality of different end user devices. Any of the devices 110, 113,120 and 123 may also be capable of connecting to the translation services server 145. For ease of explanation, only a teleconference session between devices 110 and 120 will be described in detail. Devices 113 and 123 may participate in their own teleconference separate from devices 110 and 120. Any other connected devices, such as devices 113 and 123 may operate in a similar manner as devices 110 and 120.

The translation services server 145 may be connected to the conferencing services server 140. The speech-to-text converter (STC) 150, the text-to-speech converter (TSC) 160 and the text translator 170 may be connected to and managed by the translation services server 145 via a network connection, such as the Internet, LAN or WAN, to allow for the transfer of data and control signals. The speech-to-text converter (STC) 150, the text-to-speech converter (TSC) 160 and the text translator 170 may also be connected directly to one another, which may allow the translation services server 145 to be omitted during some processes. The data storage 130 can be any form of data storage device such as a hard disk, non-volatile memory, FLASH memory or the like.

The STC 150 may be a server with a processor(s) and/or memory. The STC 150 may include inputs for receiving audio and audio video signals from the translation services server 145. The STC 150 may be configured to identify a language of the received input audio signals, and access a plurality of different processes to convert the audio signals of the identified language into text of the identified language. The identity of the language in the input audio signals may be recognized by the STC 150 or indicated by a user preferences signal incorporated in the input audio signals. The TSC 160 may be a server with a processor(s) and/or memory. The TSC 160 may be configured to receive text signals from the STC 150 and the text translator 170, and convert the text into audio signals representing speech. In addition to receiving signals from the STC 150 and the text translator 170, the TSC 160 may receive text signals from other sources such as the translation services server 145.

The text translator 170 may be a processor or may be a processor hosted on a server. The text translator 170 may be configured to translate text from a first language into text of a second language. The text translator 170 may have access to a plurality of translation processes for translating text from one language to another. These different processes may be maintained in data storage 130, or stored within the text translator 170.

The translation services server 145 and the conferencing services server 140 may also exchange data related to timing of the delivery of text or audio signals, communication channel status, and other data useful for managing the communication between the end user devices participating in a communication session. The translation services server 145 may be capable of participating in a plurality of conferences and responding to a plurality of different translation requests from end user devices.

Figure 2A:
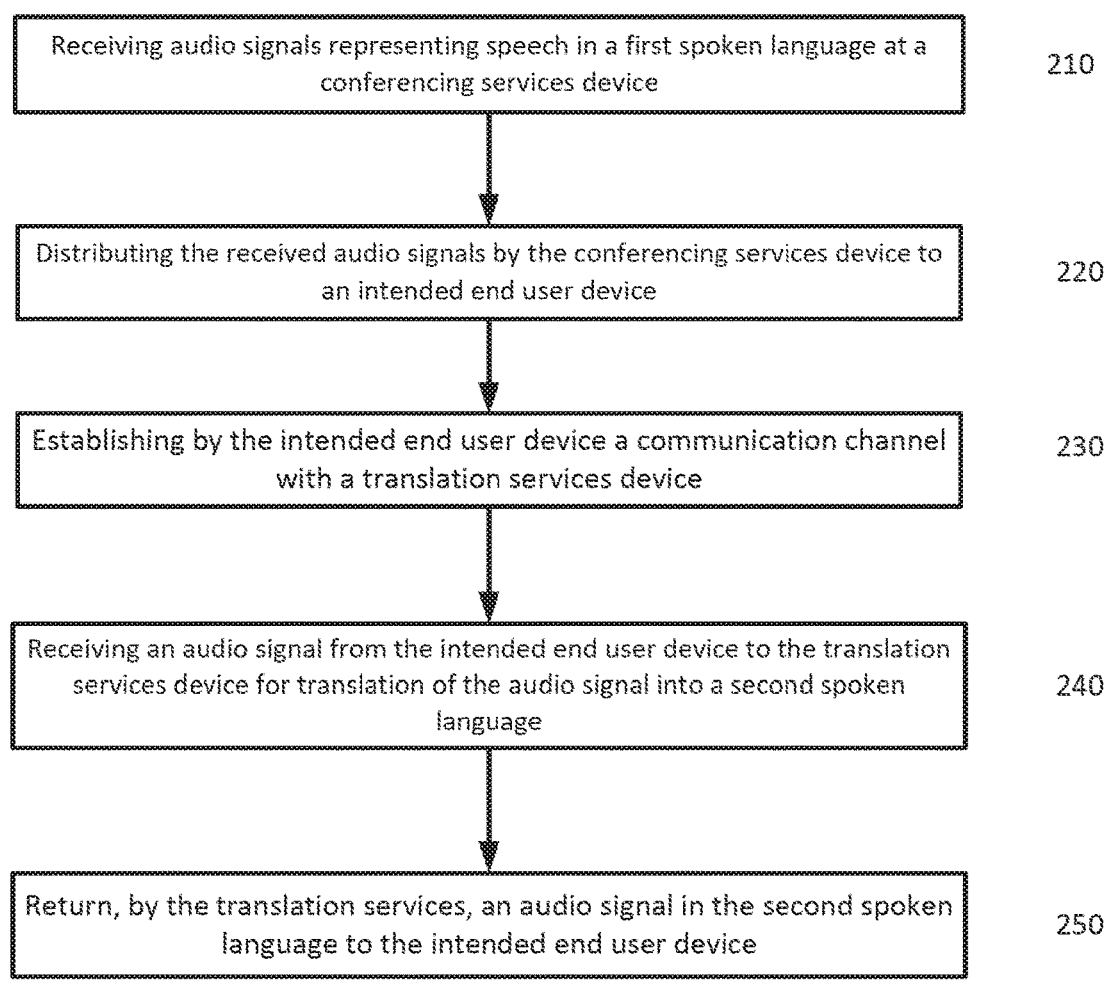
FIGS. 2A and 2B show flowcharts according to an embodiment of the disclosed subject matter.
Figure 2B:
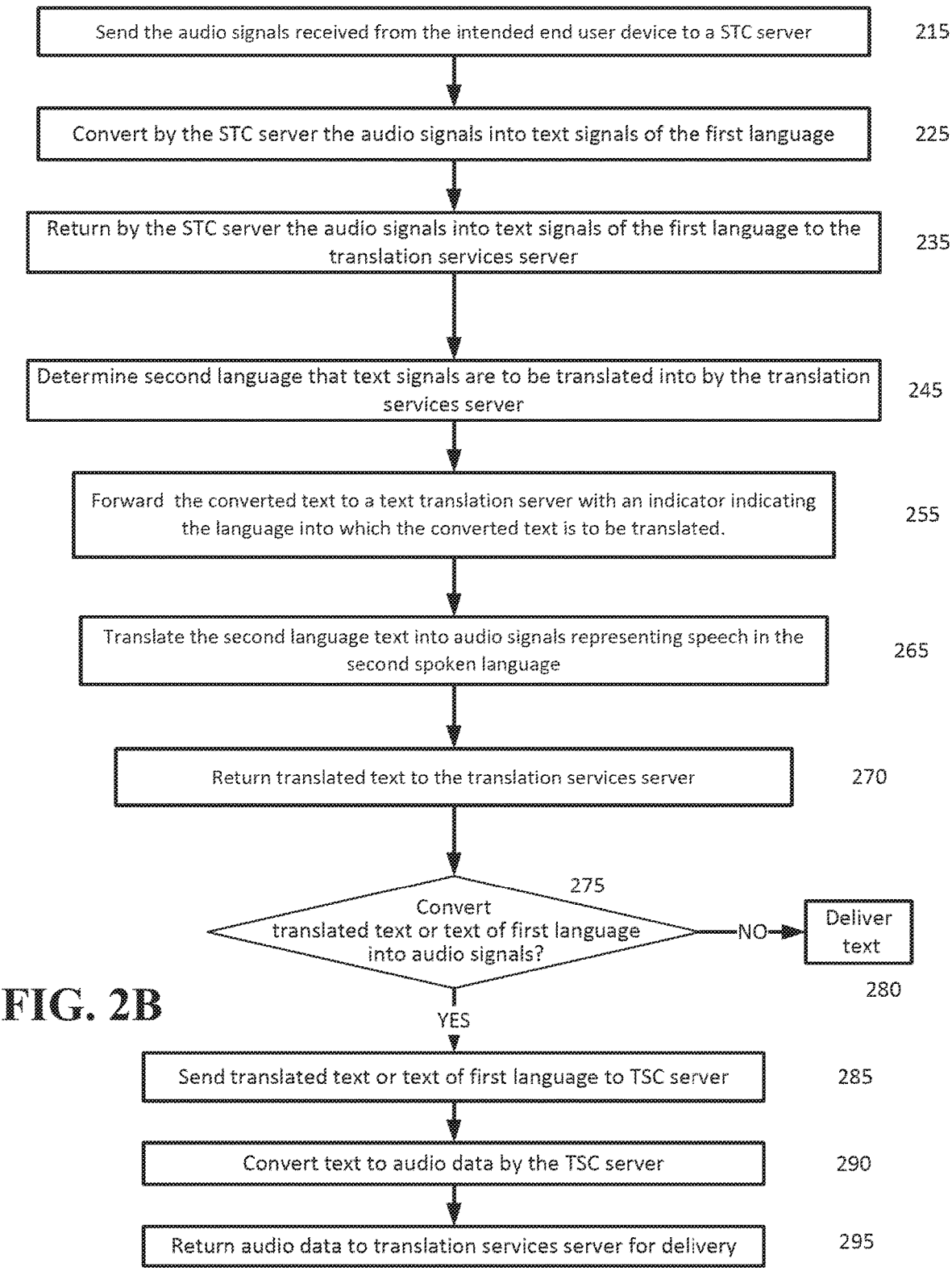

FIGS. 2A and 2B illustrate exemplary methods according to an embodiment of the disclosed subject matter. The operation of the system 100 will be explained with reference to FIG. 2A, while the operation of the translation services server may be described with reference to FIG. 2B. Devices 110 and 120 may be operated, for example, by participants in a chat, teleconference, or videoconference. A chat may be the exchange of textual data, a teleconference may be the exchange of audio data, and a video conference may be the exchange of both audio and video data. During the setup of the chat or teleconference, the conferencing services server 140 may request or be provided with the language preferences of the end user devices participating in the chat, teleconference, or videoconference. As noted above, end user devices 110 or 120 may have more than one language preference setting. For example, an end user device 110 or 120 may have settings for a primary language preference and several secondary preferences. The language preference may automatically be provided to the conferencing services server 140 by the end user device 110 or 120 either when the communication is setup or during the communication. Alternatively, the language preference may be indicated by an end user device 110, 113, 120, or 123 when the communication is initially setup. The conferencing services server 140 may be configured to include an indicator of the primary language preference of the participating devices with audio signals when forwarding the received audio signals to the receiving, or intended, end user device 110, 113, 120, or 123. In an example of a teleconference, a participant using a first end user device 110 may speak a first language, such as English, and a participant using the second end user device 120 may speak a second language, such as French. As a result, the primary language preference of the first end user device 110 may be set to English, and the primary language preference of the second end user device 120 may be set to French.

As the end user devices communicate in the teleconference, the participants' speech may be converted by the respective end user device 110 or 120 into encoded audio signals that may be incorporated into an output data stream from the end user devices 110 or 120. At step 210 of FIG. 2A, the encoded audio signals representing the speech in the first spoken language may be received at the conferencing services server 140. The conferencing services server 140 may directly process the encoded audio signals. The conferencing services server 140 may forward the encoded audio signals to the intended end user device (e.g., 110, 113, 120 or 123). Upon delivery of the encoded audio/video signals to the intended (i.e., the second) end user device 120 (Step 220), a computer application executing on the respective end user device 120 may intercept the audio signals and may recognize the language of the encoded audio signals. The recognition of the language may be based on an identifier embedded in the audio signals based on a language preference of the sending end user device. If the end user device 120 determines that the received encoded audio signals are not of the same language preferences as the language preferences of the receiving end user device 120, the receiving end user device may establish a communication channel with a translation services server 145 separate from the communication channel with the conferencing services server 140 (Step 230). The output data stream from the respective device 110 or 120 may include an indication of the primary language preference of the respective device 110 or 120 to the translation services server 145. Alternatively, if a primary language preferences identifier is not provided in the data stream from the sending (i.e., the first) end user device 110, the respective receiving end user device 120 may analyze the received encoded audio signals, and recognize the language of the encoded audio signals using language recognition processes of the computer application. The language recognition may be performed using multiple recognizers, i.e. one for each potential language. Then compare the confidences that each recognizer returns. For example, an automatic speech recognition (ASR) engine may maintain a rank ordered list of all hypotheses that match the audio. As new speech audio arrives at the ASR engine, the hypotheses are extended and their rank order may change. Whenever the top candidate changes, a notification of the change is sent. Other ASR techniques may be used, in addition to or instead of the previous descriptions of illustrative ASR methods.

Continuing with the above example, the receiving, or intended, end user device 120 may compare its language preference settings with the language preference identifiers embedded in the encoded audio signals sent by sending end user device 110, or perform language recognition to determine the compatibility of the languages. Upon making the determination that the language of the received audio signals are not compatible with the language preferences of the receiving end user device 120, the receiving, or intended, end user device 120 may send the received audio signals to the translation services server 145 for translation into a second language. (Step 240). As another example, the intended end user device 120 may send the received audio signals directly to the translation services server 145 without performing any type of language recognition or language preference comparison. In this case, the intended end user device 120 may further embed indicators of its language preference setting into the data stream that includes the encoded audio signals. The translation services server 145 may perform language recognition processes to confirm that the language of the audio signals corresponds to the primary language preference indicator, or a secondary language preference indicator provided by the sending end user device 110. If the language preference indicator does not correspond to the language recognized by the language recognition process, the translation services server 145 may perform language translation corresponding to the language recognized by its own processes.

The operation of the translation services server 145 will be described with respect to FIG. 2B. The translation services server 145, based on either the primary language preference indicator or the recognition of the language of the encoded audio signals, may at step 215 deliver the audio signals including a language preference indicator to the STC 150 for conversion from speech to text. The STC 150 may use the language preference indicator to call the appropriate speech to text conversion algorithms. The speech to text conversion may be performed using known methods of speech-to-text conversion. The received audio signals may be converted from audio signals of the first spoken language into text. (Step 225). Continuing with the example, the STC 150 may convert the first language audio signals from end user device 110 into text in the first language, by using the called conversion algorithm. For example, English audio signals may be converted into English text. The converted text may be stored. The STC 150 may provide the converted text to the translation services server 145 either directly or from the buffer.

At step 235, the STC 150 may return the converted text to the translation services server 145. A decision on the language the converted text is to be translated into may be made at step 245. The translation services server 145 may, for example, review the language preferences indicator included with the audio signals to determine whether the converted text needs to be translated into another language. The translation services server 145 may forward the converted text to a text translator server 170 at step 255. The text translator 170 may call the appropriate translation engine or engines based on the indicated language preference. At step 265, the text translator 170 may perform the translation of the text from the first language into text in the second language, as well as any additional languages, based on the language preference indicators. For example, the text translator 170 may translate the English text to French text (i.e., first language to the second language) using a translation table containing text data corresponding to English words and corresponding to French words or a similar type of translation mechanism. (Step 265). The text translation performed by the text translator 170 may be performed using, for example, statistical machine translation and/or rules-based machine translation. Statistical translation may be performed by searching for sub-phrases (down to a single word) and up to the complete phrase or sentence, in a phrase table of translations. Potential hypotheses may be computed for the many different combinations of matching phrases from the phrase table can be combined to produce a potential translation. Those hypotheses may be scored according to a number of different metrics. An exemplary metric may be a language model that may determine the likelihood of the produced translation being a reasonable sentence in the target language. The produced translation with the highest likelihood score may be chosen. The rules-based machine translation may use linguistic rules and vocabulary tables to produce a translation. The text translator 170 may store the translated text in a text file. At step 270, the text translator 170 may return the translated text to the translation services server 145.

At step 275, the conferencing services server 140 may determine whether the translated text file or converted text files are to be converted into audio files for output as speech. This may, for example, be indicated during the initial set-up of the communication between the participant's devices or based on the indicators in the data stream. If the determination is NO, the text is not to be converted into audio files; the translation services server 145 may deliver the converted text, the translated text or both to the end user device 120. (Step 280).

In response to a determination at step 275 that the text is to be converted into audio files ("YES"), the translation services server 145 at step 285, may deliver the translated text to a TSC 160 server. At step 290, the translated text may be converted by a processor in the TSC 160 server into audio data of speech in a second spoken language. Continuing with the earlier example, the translated English-to-French (first language-to-second language) text may be delivered by the translation services server 145 to the TSC 160. The French (second) language text may be converted by the TSC 160 into audio signals representing speech in French, or the second language. At step 295, the TSC 160 may return the audio signals to the translation services server 145 for delivery to the device 120.

Returning back to step 245, if the decision is NO, the converted text does not need to be translated, the process may proceed to step 275. At step 275, the translation services server 145 may determine whether the converted text files are to be converted into audio files for output as speech. This may, for example, be indicated during the initial set-up of the communication (i.e., teleconference or videoconference) between the end user devices or based on the indicators in the audio data stream. If the determination is NO, the text is not to be converted into audio files; the translation services server 145 may deliver the converted text, the translated text or both back to the end user device 120 for output at step 280.

If the decision at step 275 is YES, the converted text is to be converted to audio signals. The translation services server 145 at step 285 may deliver the translated text to a TSC 160 server. At step 290, the translated text may be converted by a processor in the TSC 160 server into audio data of speech in a second spoken language.

The translation services server 145 may deliver the translated French, or second language, audio signals to the end user device 120 (Step 295). In alternative embodiments, the translation services server 145 may deliver the translated second language text and/or the first language text in addition to the second language audio signals to the device 120. The TSC server 160 may store the audio data in an audio data file. The translation services server 145 may forward an audio and/or text transcript of the translated text or audio to the conferencing services server 140 for incorporation into a transcript of the respective teleconference. For example, each teleconference managed by the conferencing services server 140 may have an identifier. The identifier may be provided to the translation services server 145 by the end user device 120 when connecting to the translation services server 145.

Communication from the end user device 120 to the end user device 110 may be processed in a similar manner as described above with respect to the communication between end user device 110 and 120. Similarly, communication between the end user devices 113 and 123 may communicate with one another, conference services server 140, translation services 145, and end user devices 113 and 123. The processing of the received audio, subsequent conversion to text, and translation may be performed in substantially real time to provide the participants with an experience similar to having a conversation in the same room.

The STC 150, TSC 160 and text translator 170 may also be connected to one another without the translation services server 145 acting as an intermediary. In which case, the STC 150, TSC 160 and text translator 170 may deliver the respective output signals to one another based on control signals from the translation services server 145. The output audio signals to be output to the end device, such as device 120 in the above example, may be delivered by translation services server 145.

As mentioned above, the text generated by the STC 150 may be buffered. The buffered text may be stored in a data file for subsequent use by participants in the chat or teleconference. The data file may be a searchable transcript that can be archived for post conversation retrieval. In an example of a chat, the conversion of the text to speech by the TSC 160 may not be necessary. In this case, step 240 may be optional, and only the translated text may be delivered to the device 120 by the conferencing services server 140. As a result, two translation modes, one mode with audio and another mode without audio may be provided. Participants that speak the same language may indicate that only the converted text should be displayed on the respective devices 110 and 120 to allow the conversation to be followed in the event the audio signal is less than optimal.

During the chat or teleconference, the conferencing services server 140 and the translation services server 145 may respond to real-time control inputs from the respective devices 110 or 120. An end user device 110 may change a language preference indication during the conversation. For example, a user may be more proficient in Chinese, and change the English language preference to a Chinese language preference. In response to the changed language preference, the translation services server 145 may output an updated language preference control signal to the STC 150. In response to the updated language preference control signal, the STC 150 may begin converting the input audio signals to Chinese text instead of English text.

As mentioned above, the translation services server 145 may periodically (e.g., every ten seconds) recognize the language from each device 110, 120 during the teleconference or chat, and may note any change in language from the first or second language to a third language, by generating an updated language preference indicator. For example, a participant may stop speaking English during part of the teleconference, and begin speaking Chinese. In which case, the translation services server 145 upon recognizing the change in languages from the particular device may automatically provide an updated language preference indicator to the STC 150 indicating the new language. This allows the system 100 to accommodate different language capabilities of teleconference or chat participants that may be sharing a device. For example, one of the co-located participants may not be as fluent in the preferred, primary language as another co-located participant, and when a complex discussion needs to occur, it would be advantageous if the participant could change to the language with which they are more fluent.

The conferencing services server 140 may be configured to output the stored first language text, buffered second language text, or output the buffered second language audio signals. The translation services server 145 may be further configured to output the stored second language audio signals and the stored second language text. A transcript of the audio signals and text signal in each of the first, second and third language may be maintained in the data storage 130 or in the respective server 150, 160 or 170 memory. The transcripts may be updated during the exchange of text and audio data signals between the communicatively coupled devices 110 and 120. The audio and text transcripts may be updated during the exchange of text and audio data signals between the communicatively coupled end user devices 110, 120 by the conferencing services server 140.

The stored transcript may also include alternate translation options, so end user devices can deliver other possible translation candidates exist, and the user may be allowed to select the appropriate word. For example, the English words "bare" and "bear" have similar pronunciations, but have different meanings.

Figure 3:
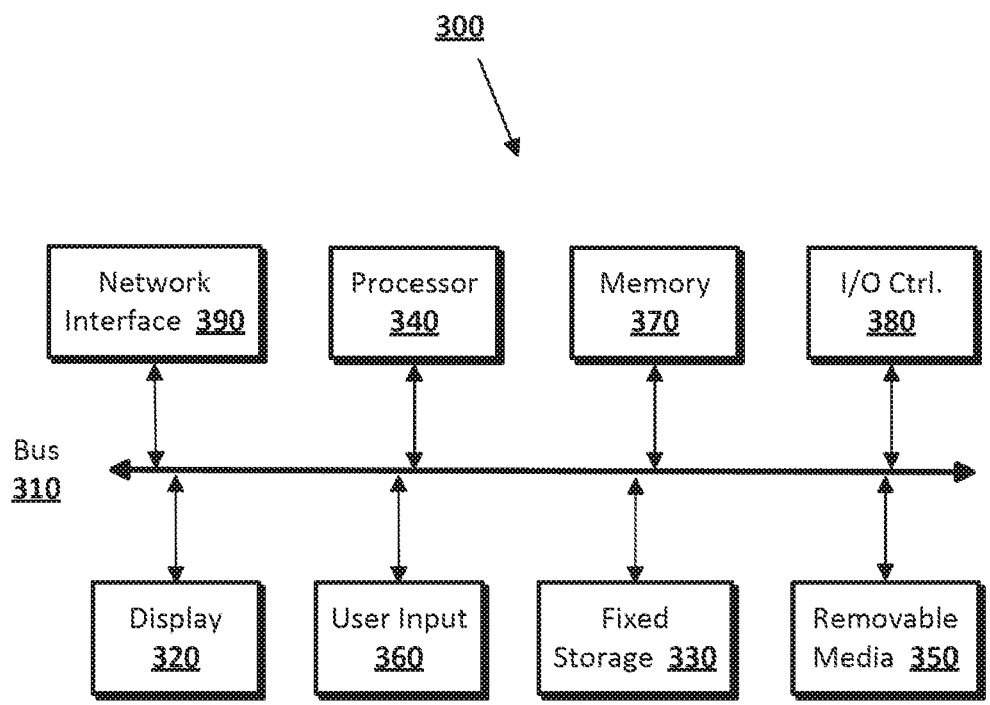
FIG. 3 shows a computer according to an embodiment of the disclosed subject matter.

Embodiments of the presently disclosed subject matter may be implemented in and used with a variety of component and network architectures. FIG. 3 is an example computer 300 suitable for implementing embodiments of the presently disclosed subject matter. The conferencing services server and translation services server may be incorporated into computer 300 or may be multiple computers similar to computer 300. The computer 300 includes a bus 310 which interconnects major components of the computer 300, such as a central processor 340, a memory 370 (typically RAM, but which may also include ROM, flash RAM, or the like), an input/output controller 380, a user display 320, such as a display screen via a display adapter, a user input interface 360, which may include one or more controllers and associated user input devices such as a keyboard, mouse, and the like, and may be closely coupled to the I/O controller 380, fixed storage 330, such as a hard drive, flash storage, Fibre Channel network, SAN device, SCSI device, and the like, and a removable media component 350 operative to control and receive an optical disk, flash drive, and the like.

The bus 310 allows data communication between the central processor 340 and the memory 370, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 300 are generally stored on and accessed via a computer readable medium, such as a hard disk drive (e.g., fixed storage 330), an optical drive, floppy disk, or other storage medium 350.

The fixed storage 330 may be integral with the computer 300 or may be separate and accessed through other interfaces. A network interface 390 may provide a direct connection to a remote server via a telephone link, to the Internet via an internet service provider (ISP), or a direct connection to a remote server via a direct network link to the Internet via a POP (point of presence) or other technique. The network interface 390 may provide such connection using wireless techniques, including digital cellular telephone connection, Cellular Digital Packet Data (CDPD) connection, digital satellite data connection or the like. For example, the network interface 390 may allow the computer to communicate with other computers via one or more local, wide-area, or other networks, as shown in FIG. 4.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 370, fixed storage 330, removable media 350, or on a remote storage location.

Figure 4:
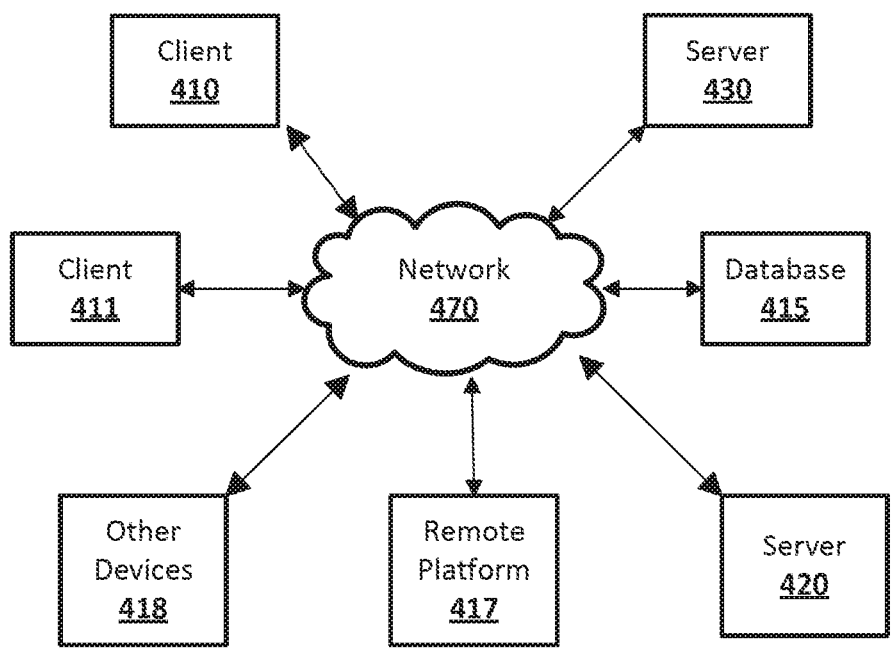
FIG. 4 shows a network configuration according to an embodiment of the disclosed subject matter.

FIG. 4 shows an example network arrangement according to an embodiment of the disclosed subject matter. One or more clients 40, 41, such as local computers, smart phones, tablet computing devices, and the like may connect to other devices via one or more networks 49. The network may be a local network, wide-area network, the Internet, or any other suitable communication network or networks, and may be implemented on any suitable platform including wired and/or wireless networks. The clients may communicate with one or more servers 43 and/or databases 45. The devices may be directly accessible by the clients 40, 41, or one or more other devices may provide intermediary access such as where a server 43 provides access to resources stored in a database 45. The clients 40, 41 also may access remote platforms 47 or services provided by remote platforms 47 such as cloud computing arrangements and services. The remote platform 47 may include one or more servers 43 and/or databases 45.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer processor, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description and following appendices, for purpose of explanation, have been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A method comprising:
receiving, at data processing hardware, an output data stream from a user device, the output data stream comprising a language preference indicator and first audio signals representing speech in a first language, the language preference indicator comprising a target language specified by a user of the user device for translating the speech in the first language, and the language preference indicator embedded into the output data stream by the user device;
converting, by the data processing hardware, the first audio signals into text in the first language;
translating, by the data processing hardware, the text in the first language into text in the target language using the language preference indicator;
converting, by the data processing hardware, the text in the target language into second audio signals representing a spoken version of the text in the target language; and
transmitting, by the data processing hardware, the second audio signals representing the speech in the target language to the user device.

2. The method of claim 1, wherein translating the text in the first language into text in the target language comprises using statistical machine translation to produce a translation in the target language from the text in the first language.

3. The method of claim 1, wherein translating the text in the first language into text in the target language comprises using rules-based machine translation to produce a translation in the target language form the text in the first language.

4. The method of claim 1, wherein the data processing hardware resides on a remote platform in communication with the user device via a wide area network.

5. The method of claim 1, wherein the user device is configured to audibly output the received second audio signals as synthesized speech in the target language.

6. The method of claim 1, wherein the user device is configured to:
establish a communication channel with a remote server implementing the data processing hardware; and
transmit the output data stream over the communication channel to the remote server.

7. The method of claim 1, further comprising, after converting the first audio signals into the text in the first language, transmitting, by the data processing hardware, the text in the first language to the user device.

8. The method of claim 7, wherein the user device is configured to display the text in the first language on a display of the user device.

9. The method of claim 1, further comprising, when transmitting the second audio signals representing the speech in the target language to the user device, transmitting at least one of the text in the first language or the text in the target language to the user device.

10. The method of claim 1, wherein the user device comprises a microphone configured to capture speech spoken by the user and a speaker configured to output audio.

11. A system comprising:
data processing hardware; and
memory hardware in communication with the data processing hardware and storing instructions that when executed by the data processing hardware cause the data processing hardware to perform operations comprising:
receiving an output data stream from a user device, the output data stream comprising a language preference indicator and first audio signals representing speech in a first language, the language preference indicator comprising a target language specified by a user of the user device for translating the speech in the first language, and the language preference indicator embedded into the output data stream by the user device;
converting the first audio signals into text in the first language;
translating the text in the first language into text in the target language using the language preference indicator;
converting the text in the target language into second audio signals representing a spoken version of the text in the target language; and
transmitting the second audio signals representing the speech in the target language to the user device.

12. The system of claim 11, wherein translating the text in the first language into text in the target language comprises using statistical machine translation to produce a translation in the target language from the text in the first language.

13. The system of claim 11, wherein translating the text in the first language into text in the target language comprises using rules-based machine translation to produce a translation in the target language form the text in the first language.

14. The system of claim 11, wherein the data processing hardware resides on a remote platform in communication with the user device via a wide area network.

15. The system of claim 11, wherein the user device is configured to audibly output the received second audio signals as synthesized speech in the target language.

16. The system of claim 11, wherein the user device is configured to:
establish a communication channel with a remote server implementing the data processing hardware; and
transmit the output data stream over the communication channel to the remote server.

17. The system of claim 11, wherein the operations further comprise, after converting the first audio signals into the text in the first language, transmitting the text in the first language to the user device.

18. The system of claim 17, wherein the user device is configured to display the text in the first language on a display of the user device.

19. The system of claim 11, wherein the operations further comprise, when transmitting the second audio signals representing the speech in the target language to the user device, transmitting at least one of the text in the first language or the text in the target language to the user device.

20. The system of claim 11, wherein the user device comprises a microphone configured to capture speech spoken by the user and a speaker configured to output audio.

* * * * *